No. 87... 
PATENTED DEC. 10, 1907.
D. H. NORRIS.
APPARATUS FOR SEPARATING THE METALLIC PARTICLES OF ORES FROM THE ROCKY CONSTITUENTS THEREOF.
APPLICATION FILED AUG. 7, 1907.
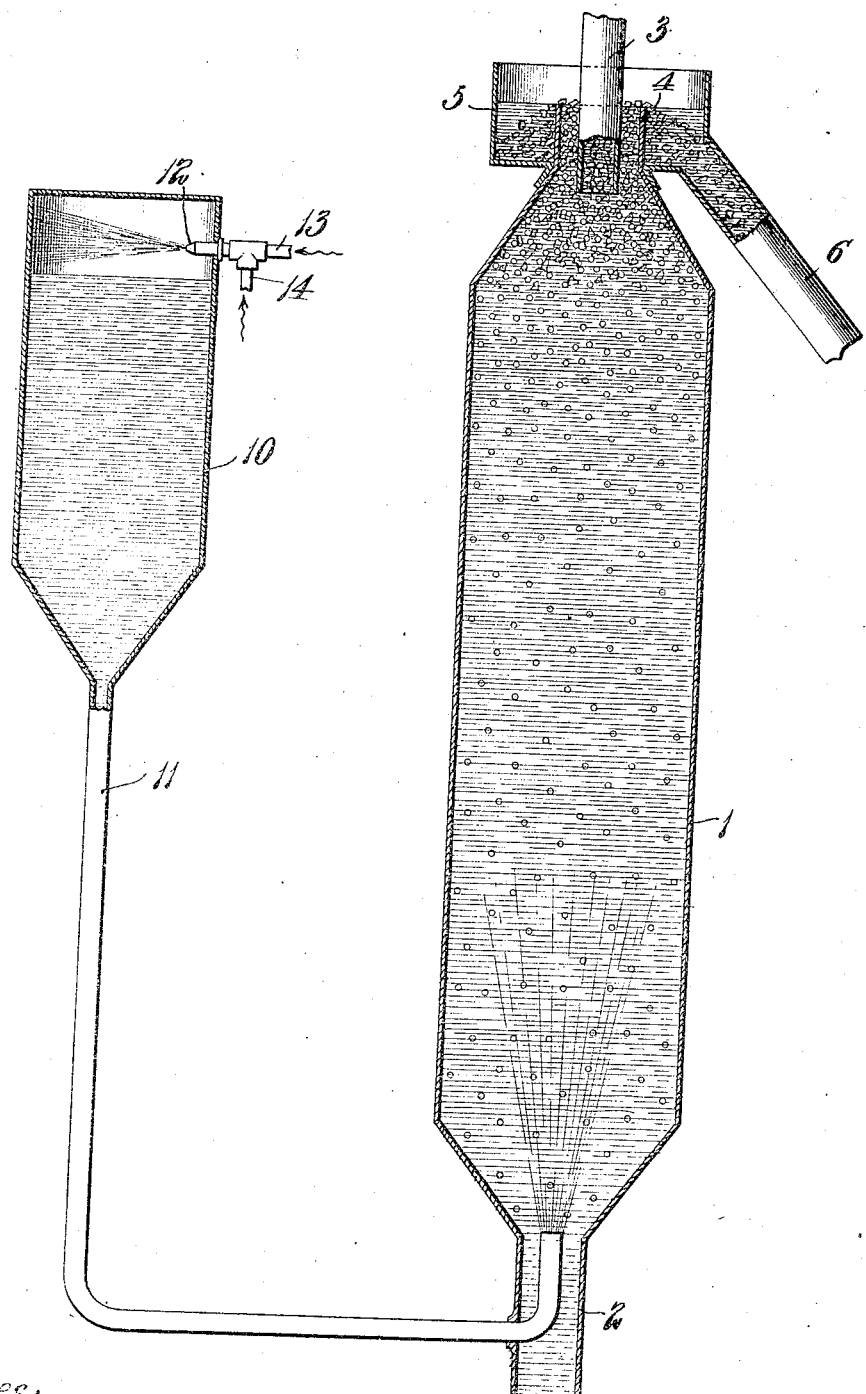
Witnesses:
Inventor,
Dudley H. Norris.

UNITED STATES PATENT OFFICE.

DUDLEY HIRAM NORRIS, OF NEW YORK, N. Y.

APPARATUS FOR SEPARATING THE METALLIC PARTICLES OF ORES FROM THE ROCKY CONSTITUENTS THEREOF.

No. 873,586.      Specification of Letters Patent.      Patented Dec. 10, 1907.

Original application filed November 19, 1906, Serial No. 344,041. Divided and this application filed August 7, 1907. Serial No. 387,443.

*To all whom it may concern:*

Be it known that I, DUDLEY HIRAM NORRIS, a citizen of the United States, residing at the city, county, and State of New York, have invented a certain new and useful Improvement in Apparatus for Separating the Metallic Particles of Ores from the Rocky Constituents Thereof, of which the following is a full, clear, and exact description, such as will enable others skilled in the art to which it appertains to make and use the same, reference being had to the accompanying drawings, forming part of this specification, in which the figure is a vertical sectional view of my improved form of apparatus.

This invention relates to the concentration of metallic ores, and consists in a novel apparatus for separating the metallic particles contained in such ores from the barren or rocky constituents thereof.

Various forms of apparatus have heretofore been experimented with for separating the metallic particles of ore from the rocky constituents of the ore, but none of said apparatuses have proved satisfactory in every respect, one serious objection being the cost of operation.

One form of apparatus that has been tested in high altitudes and failed to produce satisfactory results comprised a receptacle adapted to receive a flowing mixture composed of pulverized ore, oil and water, and means for creating a vacuum over the surface of the mixture to cause bubbles of air to form throughout the mixture. The theory upon which said apparatus was designed to operate was that these bubbles of air would rise to the surface of the mixture and, in their upward travel, would attach themselves to the oil-coated metallic particles of the ore and thus carry said metallic particles to the surface of the mixture, where they could be collected and saved for metallurgical treatment, the barren or rocky particles of the ore sinking to the bottom of the receptacle.

It will be seen that in an apparatus of the character just described the successful operation of the apparatus depends upon the amount of air contained in the water which will form into bubbles throughout the mixture and thus float the oil-coated metallic particles of the ore to the surface of the mixture. At high altitudes the amount of air in the water obtained in such localities is very greatly diminished owing to the fact that the pressure of the atmosphere is less at higher altitudes than at lower altitudes, the higher altitudes having the effect of a partial vacuum. Consequently, an apparatus of the character previously described will not operate satisfactorily in high altitudes as the water obtained in high altitudes does not contain a sufficient quantity of air to cause enough bubbles to form in the mixture to carry the metallic particles of the ore to the surface of the mixture. Furthermore, an apparatus of the character described is apt to not operate satisfactorily even at low altitudes as a rise in the temperature or some other cause may reduce the amount of air in the water to such an extent that a sufficient quantity of bubbles will not form in the mixture to carry the metallic particles to the surface.

I have devised an apparatus for separating the metallic particles of ore from the rocky particles thereof which can be operated at a very low cost and which does not depend for its successful operation upon the condition of the water obtained at any given altitude or upon any other given conditions.

Briefly stated, my apparatus consists of a receptacle or tank preferably open at its upper end, means for introducing a flowing mixture of pulverized ore mixed with water into said receptacle and means for causing infinitesimally small nascent bubbles of air to form continuously in said flowing mixture, said bubbles rising and attaching themselves to the metallic particles of the ore, and thus carrying said metallic particles to the surface of the mixture where they are collected for further metallurgical treatment, the rocky or barren particles of the ore passing out of the tank through a discharge pipe at the lower end thereof.

The apparatus herein shown, which forms the subject of my present invention, and which is used for practicing the method described in my pending application Serial No. 344,041, filed November 19, 1906, consists of an open-ended receptacle or tank 1 that is preferably conical-shape at its opposite ends and is provided at its lower end with a discharge pipe 2. The pipe 3 that leads from a mixer, not shown, in which the pulverized ore and water are thoroughly mixed together, enters the upper end of the receptacle or tank 1 for conveying the flowing mixture into said tank, and surrounding the contracted portion 4 at the upper end of the tank is a cup-shaped member 5 having a discharge conduit 6 leading therefrom.

The means for introducing a stream of water containing air in solution into the receptacle 1 comprises a closed receptacle 10 which may be of any shape or size and a pipe 11 leading from said receptacle into the lower end of the tank 1. Water and air under pressure may be introduced into the receptacle 10 in various ways, it being preferable to inject a spray into said receptacle by means of a nozzle 12 to which an air pipe 13 and water pipe 14 lead. This can also be accomplished by means of a fine spray or shower of water falling from a nozzle at the top of the receptacle 10 through the compressed air in said receptacle. The upper end of the tank 1 being open, the stream of water containing air in solution which enters the lower end of the tank will cause infinitesimally small nascent bubbles of air to form continuously in the flowing mixture in said tank, and as these bubbles rise they attach themselves to the metallic particles of the ore and carry them to the surface of the mixture where they are either skimmed off or allowed to overflow into the cup-shaped member 5, the water and rocky particles of the ore passing out of the tank through the discharge pipe 2. Preferably, the stream of water charged with air and the mixture of pulverized ore and water flow continuously into the tank 1, thereby causing the metallic particles of the ore to flow continuously from the upper end of the tank, and the rocky particles and waste water to flow continuously from the lower end of the tank.

From the foregoing description it will be seen that I have produced an apparatus for separating the metallic particles of ore from the rocky constituents thereof which is entirely automatic in its operation and can thus be maintained and operated at a low cost, and which is not dependent for its successful operation upon the amount of air that by accident may be contained in the water that is mixed with the pulverized ore to form the flowing mixture.

Having thus described the invention, what is claimed as new and desired to be secured by Letters Patent is:

1. An apparatus of the character described, comprising a receptacle having its upper end open to the atmosphere and adapted to receive a flowing mixture of pulverized ore and water; means for introducing a stream of water containing air in solution into the mixture in said receptacle to cause infinitesimally small nascent bubbles of air to form in said mixture and rise to the surface thereof to collect the metallic particles of the ore together, a member arranged at the upper end of said receptacle to receive the metallic particles of the ore, and a discharge pipe at the lower end of the receptacle out of which the water and the rocky particles of the ore pass; substantially as described.

2. An apparatus for separating the metallic particles of ore from the rocky particles thereof, comprising a tank having contracted ends and adapted to receive a flowing mixture of pulverized ore and water, the upper end of said tank being open, a pipe for conducting said flowing mixture into said tank, means for charging water with air, means for introducing this water in the form of a stream into said mixture after it has entered the tank to cause infinitesimally small nascent bubbles of air to form in said mixture and rise to the surface thereof to collect the metallic particles of the ore together, a cup arranged at the upper end of said tank to receive the metallic particles of the ore, a discharge pipe leading from said cup, and a discharge pipe at the lower end of the tank through which the water and rocky particles of the ore pass; substantially as described.

3. An apparatus for separating the metallic particles of ore from the rocky constituents thereof, comprising a receptacle having contracted ends, the upper end being open and the lower end being provided with a discharge pipe, means for conducting a flowing mixture of pulverized ore and water into the upper end of said receptacle, a tank for holding water, means for charging the water in said tank with air, a conduit leading from said tank to the lower end of said receptacle to introduce into the flowing mixture a stream of water containing air in solution, thereby causing infinitesimally small nascent bubbles of air to form continuously in said mixture and rise to the surface thereof to collect the metallic particles of the ore together, and a member arranged at the upper end of the receptacle to receive the metallic particles of ore; substantially as described.

In testimony whereof I hereunto affix my signature in the presence of two witnesses, this thirtieth day of July 1907.

DUDLEY HIRAM NORRIS.

Witnesses:
F. W. TAUBE,
S. G. SÁNCHEZ.